Mar. 13, 1923.
H. R. MOHRMAN
TOOL
Filed Dec. 7, 1921
1,448,230
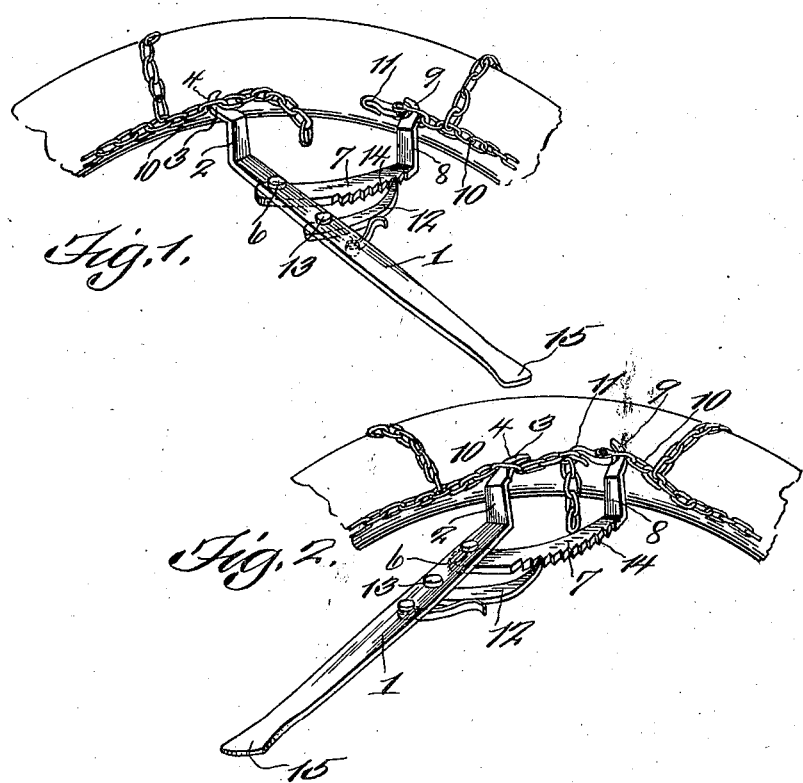
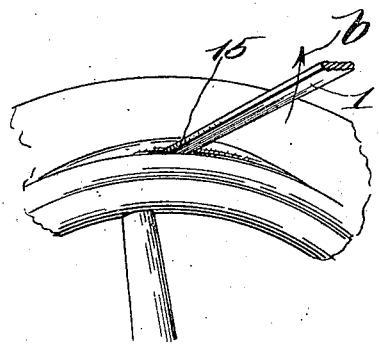
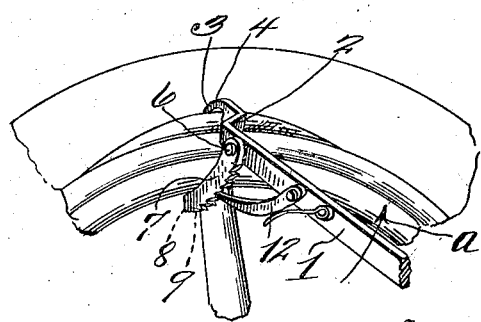
Inventor
Herman R. Mohrman,
By Watson E. Coleman,
Attorney Patented Mar. 13, 1923.

1,448,230

UNITED STATES PATENT OFFICE.

HERMAN R. MOHRMAN, OF DELL RAPIDS, SOUTH DAKOTA.

TOOL.

Application filed December 7, 1921. Serial No. 520,598.

*To all whom it may concern:*

Be it known that I, HERMAN R. MOHR-MAN, a citizen of the United States, residing at Dell Rapids, in the county of Minnehaha and State of South Dakota, have invented certain new and useful Improvements in Tools, of which the following is a specification, reference being had to the accompanying drawings.

The present invention has for its purpose the provision of a tool to be used for connecting, tightening and disconnecting automobile anti-skid chains, and incidentally for the use in pushing or lifting the clincher flanges of a tire from engagement with the clincher flanges of the rim, so that the tire may be easily removed.

Tools heretofore used for tightening, connecting and disconnecting chains of this character, or stretching other chains, the hooks of the tools are usually in the way of the chain hooks, therefore interfering with the act of opening the chain hooks, therefore for this reason the devices heretofore used have been found to be really of little practical value.

Therefore another purpose is to provide a tool for applying automobile anti-skid chains, wherein the hooks of the tool are offset in such wise that the arms of the jaws of the tool are out of the way, in fact out of alignment with the side chains of the anti-skid device, thereby enabling the hook at one end of the chain to engage a link of the opposite end of the chain, and vice versa, enabling the chain to be easily applied, as well as easily removed.

A still further purpose is the provision of a very simple and practical ratchet connection between the main and auxiliary arms or members of the tool, so as to hold the arms or members in relative positions, when tightening the chain or loosening the same.

It is well known that the clincher flanges of a tire usually become rusted or corroded into the clincher flanges of the rim of a wheel, thereby rendering it difficult to disengage the clincher flanges of the tire from those of the rim, for the purpose of putting on a new tire.

Hence, a further purpose is to provide a tool of this character, wherein the hooks of the jaws or the arms can be used for prying or disengaging the clincher flanges of the tire from those of the rim, and then by using the end of the handle of one arm or jaw to pry or disengage the tire from the rim.

Being that the hooks or the arms or jaws of the tool are offset, but in alignment, the hooks are able to perform double functions, for instance one hook may engage with the spoke, while the other hook may bear upon and push laterally on the tire, to disengage the clincher flange of the tire from the clincher flanges of the rim. In order to accomplish this work the tool is moved about the wheel from spoke to spoke, on each side thereof. In fact one hook engages the spoke, whereas the other bears against the side of the tire and disengages its clincher flange from the clincher flange of the rim. In this way the tire can be readily detached.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective showing the improved tool constructed in accordance with the invention, and in the act of connecting the ends of the side chain of an automobile anti-skid chain;

Figure 2 is a similar view showing the jaws of the tool having been drawn together to permit the ends of the side chain to be connected;

Figure 3 is a view of a segment or portion of an automobile wheel, showing the tool in the act of prying or pushing the tire laterally, so as to overcome the rust or corrosion between the clincher flanges of the tire and the rim;

Figure 4 is a view of a segment of an automobile wheel showing the end of the handle of one jaw in the act of prying the tire, so that it may be lifted off the wheel laterally.

Referring to the drawings, 1 designates a handle member, one end of which is disposed to extend laterally terminating in a hook protruding in a plane parallel with the handle. In other words the lateral portion 2 provides means for supporting a hook 3 offset from the handle. The outer curved edge 4 of the hook is designed to bear against the side of the tire, particularly adjacent where it engages the clincher flange of the rim, for the purpose of forcing the tire inwardly, and to overcome the rust or corrosion between the tire and the clincher flange of the rim.

Pivoted at 6 on the handle 1 at a point adjacent the lateral portion 2 is an arcuate curved member or jaw 7, which also has a lateral portion 8 similar to the lateral portion 2. The lateral portion 8 terminates in a hook 9, and owing to the lateral portion 8, the hook is offset from the jaw 7. In fact the hook 9 is positioned in a plane in alignment with the hook 3. It will be noted that by disposing the hooks in offset positions relatively to the handle 1 and the jaw 7, the handle 1 and the jaw 7 are out of alignment with the chain of an automobile nonskid chain, thereby preventing the handle 1 and the jaw 7 from interfering with the connecting and disconnecting of the ends of the chain 10. In fact the tool cannot only be used for fastening automobile anti-skid chains, but may also be used for tightening and connecting chains for other purposes.

It is to be noted that the handle 1 is to be used to cause the two hooks 3 and 9 to be drawn toward each other, for the purpose of tightening the chain, and since the hook jaw of the handle 1 is shorter than the jaw 7, the hook of the jaw 7 will move on an arc toward the tire, in fact tending to draw one end of the chain to a position offset from the other end of the chain, whereby the hook 11 of one end of the chain may engage with a link adjacent the opposite end of the chain. In order to hold the jaw 7 set relatively to the handle 1, a dog 12 is pivoted at 13 on the handle, and is adapted to engage any one of the notches 14 of the jaw 7, as the handle 1 is swung in a direction to tighten the chain.

When using the tool to disengage the clincher flange of the tire from the clincher flange of the rim, the lateral portion 8 of the jaw 7 is engaged with one of the spokes of the wheel, while the curved edge 4 of the hook 3 contacts with the side of the tire, immediately adjacent its clincher flange, after which the handle 1 is moved in the direction of the arrow $a$, hence causing the clincher flange of the tire to disengage from the clincher flange of the rim. The tool is used in this manner consecutively from one spoke to the other, until the clincher flange of the tire is disengaged from the rim about the entirety of the wheel. After both sides of the tire have been so disengaged from the clincher flanges of the rim, the tool is disposed so that the flat end 15 of the handle is engaged under the tire, as shown in the drawings, so that by imparting a lifting or prying movement to the tool in the direction of the arrow $b$, the tire may be stretched sufficiently to disengage it or remove it from the rim. This use of the tire may be continued until the entire tire is disengaged from the rim.

The invention having been set forth, what is claimed is:—

A tool of the character described comprising a handle provided at one end with an offset hook and having pivotally connected therewith adjacent said end one end of a jaw, the free end of the jaw being provided with an offset hook, the hooks being offset at corresponding sides of said jaw and handle and being in the same plane paralleling the plane of the handle, the connection of the jaw with the offset hook thereof forming a shoulder adapted for engagement with a wheel spoke.

In testimony whereof I hereunto affix my signature.

HERMAN R. MOHRMAN.